(12) United States Patent  (10) Patent No.: US 8,149,942 B1
Wang et al.  (45) Date of Patent: Apr. 3, 2012

(54) METHOD AND SYSTEM FOR SELECTING A TRANSMISSION SCHEME IN A MULTIPLE-INPUT-MULTIPLE-OUTPUT WIRELESS COMMUNICATIONS SYSTEM

(75) Inventors: Genyuan Wang, Plano, TX (US); Ahmadreza Hedayat, Allen, TX (US); Hanqing Lou, Garland, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1054 days.

(21) Appl. No.: 12/026,928

(22) Filed: Feb. 6, 2008

Related U.S. Application Data

(60) Provisional application No. 60/900,010, filed on Feb. 7, 2007.

(51) Int. Cl.
*H04B 7/02* (2006.01)
(52) U.S. Cl. ...................................................... 375/267
(58) Field of Classification Search .................. 375/260, 375/267, 347, 262, 265; 370/208
See application file for complete search history.

(56) References Cited

U.S. PATENT DOCUMENTS

| | | | |
|---|---|---|---|
| 6,795,424 B1 | 9/2004 | Kapoor et al. | |
| 2005/0064872 A1* | 3/2005 | Osseiran et al. | 455/452.1 |
| 2005/0094598 A1* | 5/2005 | Medvedev et al. | 370/329 |
| 2006/0109923 A1 | 5/2006 | Cai et al. | |
| 2006/0270360 A1* | 11/2006 | Han et al. | 455/69 |
| 2007/0189151 A1* | 8/2007 | Pan et al. | 370/210 |
| 2008/0039030 A1* | 2/2008 | Khan et al. | 455/101 |
| 2008/0107085 A1* | 5/2008 | Yoon | 370/333 |
| 2008/0153428 A1* | 6/2008 | Han et al. | 455/69 |
| 2008/0188186 A1* | 8/2008 | Hwang et al. | 455/69 |

FOREIGN PATENT DOCUMENTS

EP  1530388 A1  5/2005

* cited by examiner

*Primary Examiner* — Young T. Tse

(57) ABSTRACT

The present invention discloses a method for selecting a transmission scheme in a multiple-input-multiple-output (MIMO) wireless communications system. The method comprises receiving a downlink request to transmit a data stream to a wireless station, checking the availability of channel state information (CSI) associated with the wireless station, determining the validity characteristic of beamforming weighting vectors associated with the wireless station, selecting a transmission scheme from a plurality of predetermined transmission schemes based on the availability of the CSI and the validity characteristic of the beamforming weighting vectors.

30 Claims, 3 Drawing Sheets

US 8,149,942 B1

METHOD AND SYSTEM FOR SELECTING A TRANSMISSION SCHEME IN A MULTIPLE-INPUT-MULTIPLE-OUTPUT WIRELESS COMMUNICATIONS SYSTEM

CROSS REFERENCE TO RELATED APPLICATIONS

The present application claims the benefit of U.S. Provisional Application Ser. 60/900,010, which was filed on Feb. 7, 2007.

BACKGROUND

A multiple-input-multiple-output (MIMO) communications network comprises at least one base transceiver station (BTS) equipped with multiple antennas and a plurality of mobile stations (MSs), at least one of which has multiple antennas. Beamforming is a technique that utilizes multiple antennas to create beamformed channels between a BTS and an MS. Compared with a typical MIMO channel, a beamformed channel provides higher throughput and better diversity, which effectively improve the performance of a communications network.

The BTS calculates beamforming weighting vectors using channel information so as to create beamformed channels. More specifically, the BTS computes downlink beamforming weighting vectors using uplink sounding signals received from the MS. The transmission of sounding signals uses system resources. Therefore, the amount of system resources reserved for the transmission of sounding signals determines the number of MSs that can be supported in a wireless communications network.

One way to reduce the overhead incurred due to the transmission of sounding signals is that a BTS can utilize other sources, in addition to sounding signals, to obtain channel information for the computation of beamforming weighting vectors. One of these sources is uplink traffic from an MS. However, uplink traffic is of no use if certain situations occur. For example, if downlink and uplink traffic is not balanced or if there is a mismatch between the frequencies of downlink and uplink channels, channel information cannot be extracted from uplink traffic. Therefore, in order to fully utilize the multiple antennas on a BTS, the wireless communications network needs to incorporate other MIMO techniques which do not require channel information.

Space-time coding (STC) and cyclic-delay diversity (CDD) are two of the MIMO techniques that do not need channel information to construct signal streams for a MIMO channel. The STC scheme improves the performance of a wireless communications network by transmitting multiple redundant copies of a data stream. By contrast, the CDD scheme improves the network performance by transforming spatial diversity into frequency diversity by using different delays among transmit antennas. More specifically, multiple antennas transmit the same data stream with different cyclic delays. Generally speaking, the performance of a wireless communications network employing the STC scheme is inferior than that of a network employing a beamforming technique because the symbol rate is reduced in the orthogonal STC scheme when it is applied to an MS with more than two antennas in an antenna array.

None of the techniques mentioned above for utilizing MIMO channels can operate alone without leaving some issues unsolved. Therefore, a desirable way would be for a wireless communications system to adaptively switch between different transmission schemes depending on the availability of channel state information (CSI).

SUMMARY

The present invention discloses a method for selecting a transmission scheme in a multiple-input-multiple-output (MIMO) wireless communications system. The method comprises receiving a downlink request to transmit a data stream to a wireless station, checking the availability of channel state information (CSI) associated with the wireless station, determining the validity characteristic of beamforming weighting vectors associated with the wireless station, selecting a transmission scheme from a plurality of predetermined transmission schemes based on the availability of the CSI and the validity characteristic of the beamforming weighting vectors.

The construction and method of operation of the invention, together with additional objects and advantages thereof, is best understood from the following description of specific embodiments when read in connection with the accompanying drawings.

BRIEF DESCRIPTION OF THE DRAWINGS

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale

DETAILED DESCRIPTION

The following detailed description of the invention refers to the accompanying drawings. The description includes exemplary embodiments, not excluding other embodiments, and changes may be made to the embodiments described herein without departing from the spirit and scope of the invention. The following detailed description does not limit the invention. Instead, the scope of the invention is defined by the appended claims.

The present invention discloses a system and method for adaptively selecting a transmission scheme for data transmission from a base transceiver station (BTS) to a mobile station (MS) in a multiple-input-and-multiple-output (MIMO) wireless communications network. The disclosed method comprises dynamically switching between different transmission schemes including beamforming, cyclic-delay diversity (CDD), and sub-array beamforming-CDD, which requires applying a CDD scheme after the application of a beamforming scheme. Switching between different transmission schemes is performed based on predetermined criteria related to the availability of channel state information (CSI), the validity of a beamforming weighting vector associated with a particular destination MS, etc. The CSI comprises at least cross-correlations between antennas, and the Doppler Effect associated with a particular MS.

Figure 1:
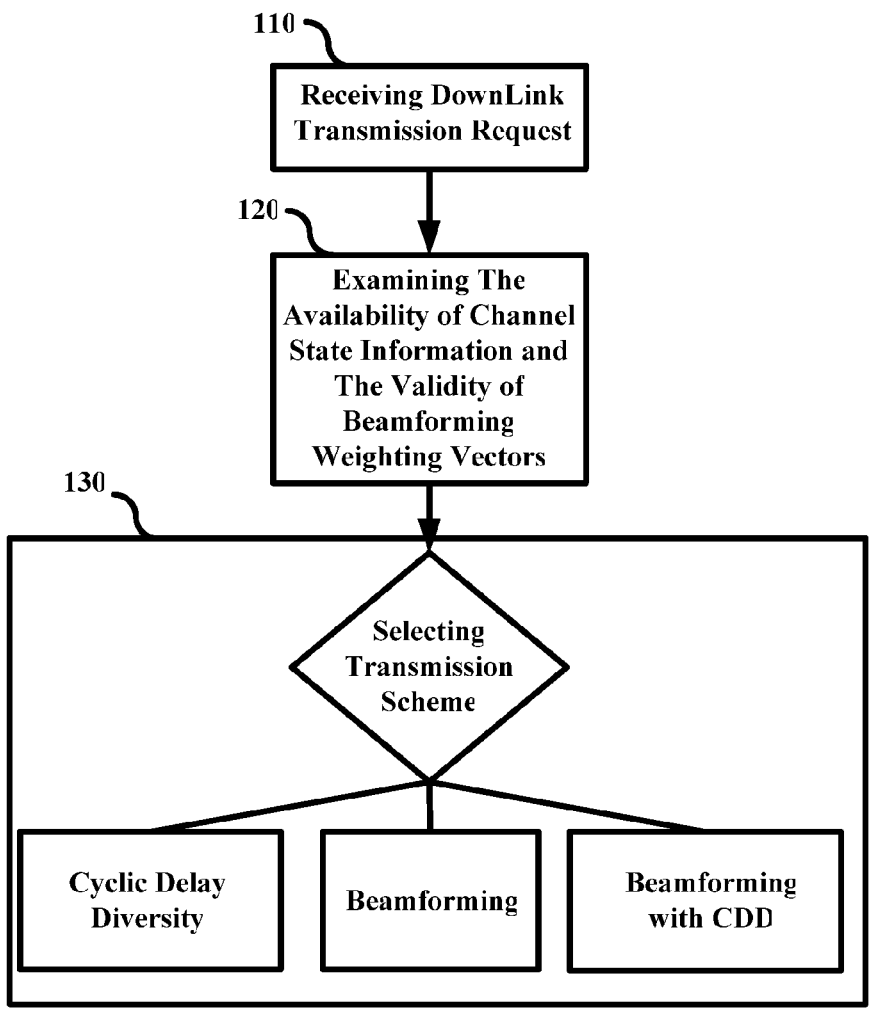
FIG. 1 is a flow diagram illustrating a method for selecting a transmission scheme in accordance with one embodiment of the present invention.

FIG. 1 is a flow diagram 100 illustrating a method for selecting a transmission scheme in accordance with one embodiment of the present invention. The method for selecting a transmission scheme includes: receive a downlink transmission request (110); examine selection criteria (120); and select a transmission scheme (130). In step 110, a BTS receives a downlink transmission request, which enables the BTS to identify a destination MS. In step 120, the BTS examines the availability of the CSI and the validity of the beamforming weighting vector associated with the destination MS.

A beamforming weighting vector associated with a particular MS is classified as one of the three states: valid, semi-valid, and invalid. The validity of a beamforming weighting vector associated with the destination MS is determined by factors such as the elapsed time since the last update of the associated beamforming weighting vector.

In order to determine if a beamforming weighting vector is valid, semi-valid or not-valid, a first and a second predetermined time period is adaptively decided based on the CSI with the first predetermined time period shorter than the second predetermined time period. Information in the CSI, including the Doppler effect and the cross-correlation between antennas on a transmitting wireless station, affect the selections of the first and second predetermined time period. The first and the second predetermined time periods are used as the criteria for the classification of a beamforming weighting vector. If the elapsed time since the last update of the associated beamforming weighting vector is shorter than the first predetermined time period, the associated beamforming weighting vector is considered valid. If, however, the elapsed time is longer than the second predetermined time period, the associated beamforming weighting vector is no longer considered valid. Otherwise, the associated beamforming weighting vector is classified as semi-valid.

In step 130, a transmission scheme is selected and applied based on the availability of CSI and the state of the associated beamforming weighting vector. If CSI is not available or the associated beamforming weighting vector is invalid, the downlink transmission is performed using the CDD scheme. Specifically, the BTS transmits the same data stream via a plurality of antennas and the transmission of the data stream is emitted from each antenna with a different cyclic delay.

If CSI is available and the associated beamforming weighting vector is valid, the downlink transmission is performed using a MIMO beamforming technique. Beamforming weighting vectors are applied to the transmitting antennas in the antenna array. Thus, the data stream is transmitted via beamformed MIMO channels.

If CSI is available and the associated beamforming weighting vector is semi-valid, the downlink transmission is performed using a sub-array beamforming with CDD scheme in which a beamforming scheme is followed by a CDD scheme. The array of antennas is first divided into subgroups. Then beamforming weighting vectors are applied to the antenna subgroups, thereby creating beamfomed MIMO channels. Next, a CDD scheme is applied to the antennas in the antenna subgroups, thereby creating cyclic delay diversity within the antenna subgroups.

Figure 2:
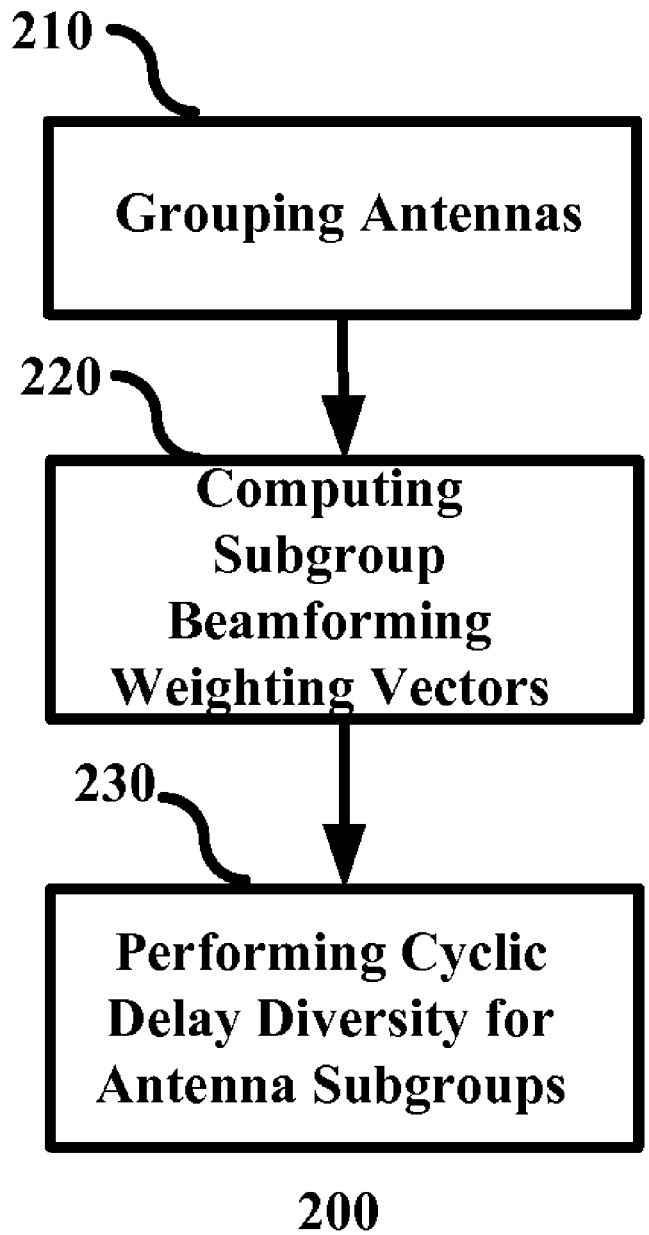
FIG. 2 is flow diagram illustrating one of the transmission schemes, sub-array beamforming-CDD scheme, of FIG. 1.

FIG. 2 is flow diagram illustrating the sub-array beamforming with CDD scheme. The sub-array beamforming with CDD scheme involves the following steps: organize the antennas into subgroups (210); compute beamforming weighting vectors for each subgroup (220); and perform CDD for each subgroup (230).

In step 210, the antenna array is divided into a first predetermined number of subgroups, each with a second predetermined number of antennas. The first and the second predetermined numbers are selected based on factors such as the cross-correlation or distance between antennas and the elapsed time since the last update of the associated beamforming weighting vector. In general, a higher correlation or a shorter distance between the antennas results in more antennas in each antenna subgroup, thereby a smaller number of subgroups. The smaller number of antenna subgroups results in a smaller number of beamformed MIMO channels. In addition, a smaller Doppler effect or a shorter elapsed time also results in more antennas in each antenna subgroup; therefore, a smaller number of beamformed MIMO channels are created. It is not necessary to have an equal number of antennas in each subgroup.

In step 220, beamforming weighting vectors are computed for each of the subgroups of antennas using the uplink sounding signals or uplink traffic. Subsequently, beamforming weighting vectors are applied to the corresponding antenna subgroups, and thus beamformed MIMO channels are created.

In step 230, a data stream is forwarded to each of the antenna subgroups. A corresponding beamforming weight is applied to the signal sequence before it is sent to each antenna subgroup. (For clarification purpose, the term "signal sequence" refers to a data stream that is being processed by the BTS before it is forwarded to an antenna or an antenna subgroup.) The weighted signal sequence for each antenna subgroup is forwarded to a CDD encoding module, which subsequently performs CDD operation to increase diversity gain in accordance with a predetermined rule.

In general, the larger the cyclic delay, the higher the diversity gain. However, having a larger cyclic delay consumes more network resources in order to obtain more accurate channel estimation, compared with a smaller one. A large cyclic delay is suitable for a suburban environment which has a relatively small number of channel taps while a small one is suitable for an urban environment which typically has a relatively large number of channel taps.

Figure 3:
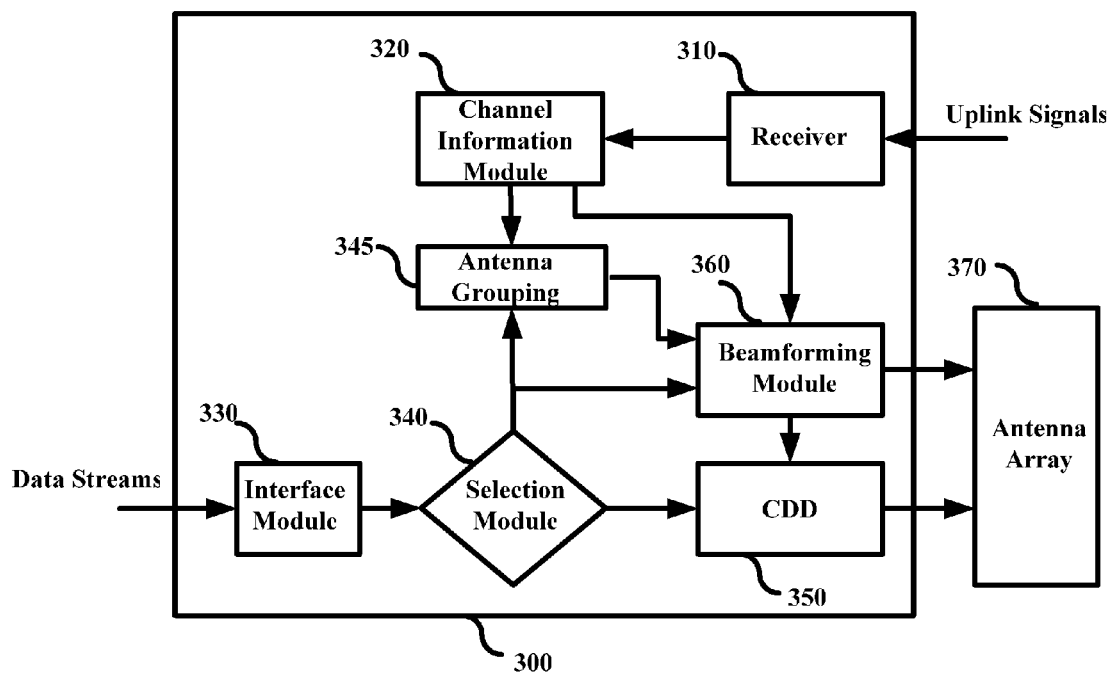
FIG. 3 is a block diagram illustrating a wireless station embodying the disclosed method in FIGS. 1 and 2.

FIG. 3 is a block diagram illustrating a wireless station embodying the disclosed method. A wireless station 300 comprises a receiver module 310, a CSI module 320, an interface module 330, a transmission selection module 340, an antenna grouping module 345, a CDD encoding module 350, a beamforming module 360, and an antenna array 370.

The receiver module 310 receives uplink signals comprising sounding signals and data from an MS. Using the uplink signals received from the MS, the CSI module 320 computes CSI and beamforming weighting vectors for the MS. In addition, the channel information module 320 maintains a timer to track the elapsed time since the last update of the beamforming weighting vector associated with the MS.

Once the interface module 330 receives a data stream destined to the MS, the transmission selection module 340 examines the selection criteria (i.e., the availability of CSI and the validity of the associated beamforming weighting vectors stored in the CSI module 320). Based on the result of the examining of the selection criteria, an appropriate transmission scheme is selected.

If CSI is not available or the associated beamforming weighting vector is invalid, the signal sequence is forwarded to the CDD encoding module 350 and subsequently transmitted to the MS via the antenna array 370. If CSI is available and the beamforming weighting vector associated with the MS is valid, the signal sequence is forwarded to the beamforming module 360 and subsequently transmitted to the MS via the antenna array 370.

If CSI is available and the associated beamforming weighting vector is semi-valid, the antenna grouping module determines an optimal grouping of antennas based on the CSI. The signal sequence is forwarded to the beamforming module 360, which then creates weighted signal sequence using a beamforming weighting vector for each antenna subgroup. The weighted signal sequence associated with each antenna subgroup is fed to the CDD module 350 and subsequently transmitted to the MS via the antenna array 370.

The above illustration provides many different embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   receiving a downlink request to transmit a data stream to a wireless station;
   determining availability of channel state information (CSI) associated with the wireless station;
   determining a validity characteristic of beamforming weighting vectors associated with the wireless station based on an elapsed time since a previous update of the beamforming weighting vectors; and
   selecting a transmission scheme from a plurality of predetermined transmission schemes based on the availability of the CSI and the validity characteristic of the beamforming weighting vectors.

2. The method of claim 1, wherein the CSI comprises cross-correlations between antennas and a Doppler effect associated with the wireless station.

3. The method of claim 1, wherein determining the validity characteristic comprises determining the validity characteristic by comparing the elapsed time since the previous update of the beamforming weighting vectors associated with the wireless station with a first predetermined time period and a second predetermined time period, wherein the first predetermined time period is shorter than the second predetermined time period.

4. The method of claim 3, further comprising determining the first and the second predetermined time periods based on the CSI.

5. The method of claim 3, wherein selecting comprises selecting cyclic delay diversity (CDD) as the transmission scheme when the CSI is not available or the elapsed time is longer than the second predetermined time period.

6. The method of claim 3, wherein selecting comprises selecting beamforming as the transmission scheme when the CSI is available and the elapsed time is shorter than the first predetermined time period.

7. The method of claim 3, wherein selecting comprises selecting sub-array beamforming with cyclic delay diversity (CDD) as the transmission scheme when the CSI is available and the elapsed time is between the first and the second predetermined time periods.

8. The method of claim 7, wherein the sub-array beamforming with a CDD scheme comprises:
   organizing antennas into antenna subgroups;
   computing the beamforming weighting vectors for each antenna subgroup;
   applying the beamforming weighting vectors to the antenna subgroups, thereby creating beamfomed multiple-input multiple-output (MIMO) channels; and
   performing the CDD scheme for antennas in the antenna subgroups, thereby creating the CDD scheme within the antenna subgroups.

9. The method of claim 8, wherein organizing the antennas comprises organizing the antennas into a predetermined number of subgroups, each with a predetermined number of antennas.

10. The method of claim 9, further comprising selecting the predetermined number of subgroups and the predetermined number of antennas based on factors comprising a cross-correlation or distance between the antennas and the elapsed time since the last update of the beamforming weighting vectors for each antenna subgroup.

11. The method of claim 10, wherein selecting the predetermined number of subgroups and the predetermined number of antennas comprises selecting relatively more antennas as the predetermined number of antennas when the cross-correlation between the antennas is relatively high.

12. The method of claim 10, wherein selecting the predetermined number of subgroups and the predetermined number of antennas comprises selecting relatively more antennas as the predetermined number of antennas when the elapsed time is relatively small.

13. The method of claim 8, wherein performing the CDD scheme comprises performing the CDD scheme with a large cyclic delay suitable for a suburban environment.

14. The method of claim 8, wherein performing the CDD scheme comprises performing the CDD scheme with a small cyclic delay suitable for in an urban environment.

15. The method of claim 1, further comprising classifying the beamforming weighting vectors as one of valid, semi-valid and invalid based on the determined validity characteristic.

16. An apparatus comprising:
   a receiver configured to receive a request to transmit a data stream to a destination wireless station;
   a channel state information (CSI) module coupled to the receiver and configured to compute and store CSI and beamforming weighting vectors associated with the destination wireless station; and
   a transmission selection module coupled to the CSI module and configured to determine availability of the CSI and a validity characteristic of the beamforming weighting vectors associated with the destination wireless station based on an elapsed time since a previous update of the beamforming weighting vectors, wherein the transmission selection module is configured to select a transmission scheme from a plurality of predetermined transmission schemes based on the availability of the CSI and the validity characteristic of the beamforming weighting vectors.

17. The apparatus of claim 16, wherein the CSI module determines the CSI based on cross-correlations between antennas and a Doppler effect associated with the destination wireless station.

18. The apparatus of claim 16, wherein the transmission selection module is configured to determine the validity characteristic by comparing the elapsed time since the previous update of the beamforming weighting vectors associated with the destination wireless station with a first predetermined time period and a second predetermined time period, wherein the first predetermined time period is shorter than the second predetermined time period.

19. The apparatus of claim 18, wherein the transmission selection module is configured to determine the first and second predetermined time periods based on the CSI.

20. The apparatus of claim 18, wherein the transmission selection module is configured to select is cyclic delay diversity (CDD) as the transmission scheme when the CSI is not available or the elapsed time is longer than the second predetermined time period.

21. The apparatus of claim 18, wherein the transmission selection module is configured to select beamforming as the transmission scheme when the CSI is available and the elapsed time is shorter than the first predetermined time period.

22. The apparatus of claim 18, wherein the transmission selection module is configured to select sub-array beamforming with cyclic delay diversity (CDD) as the transmission scheme when the CSI is available and the elapsed time is between the first and the second predetermined time periods.

23. The apparatus of claim 22, further comprising:
an antenna grouping module that is configured to:
organize a plurality of antennas into antenna subgroups;
a beamforming module configured to compute the beamforming weighting vectors for each antenna subgroup and apply the beamforming weighting vectors to the antenna subgroups, thereby creating beamfomed multiple-input multiple-output (MIMO) channels; and
a CDD module configured to perform a CDD scheme for antennas in the antenna subgroups, thereby creating the CDD scheme within the antenna subgroups.

24. The apparatus of claim 23, wherein the antenna grouping module is configured to organize the antennas into a predetermined number of subgroups, each with a predetermined number of antennas.

25. The apparatus of claim 24, wherein the antenna grouping module is further configured to select the predetermined number of subgroups and the predetermined number of antennas based on factors comprising a cross-correlation or distance between the antennas and the elapsed time since the last update of the beamforming weighting vectors for each antenna subgroup.

26. The apparatus of claim 25, wherein the antenna grouping module is further configured to select relatively more antennas as the predetermined number of antennas when the cross-correlation between the antennas is relatively high.

27. The apparatus of claim 24, wherein the antenna grouping module is further configured to select relatively more antennas as the predetermined number of antennas when the elapsed time is relatively small.

28. The apparatus of claim 22, further comprising a CDD module that is configured to perform CDD with a large cyclic delay suitable for suburban environment.

29. The apparatus of claim 22, further comprising a CDD module that is configured to perform CDD with a small cyclic delay suitable for an urban environment.

30. The apparatus of claim 16, wherein the transmission selection module is further configured to classify the beamforming weighting vectors as one of valid, semi-valid and invalid based on the validity characteristic.

* * * * *